United States Patent [19]

Misawa et al.

[11] Patent Number: 4,876,680
[45] Date of Patent: Oct. 24, 1989

[54] MONOLITHIC OPTICAL PICK-UP USING AN OPTICAL WAVEGUIDE

[75] Inventors: Shigeyoshi Misawa, Tokyo; Hiroyoshi Funato, Chigasaki, both of Japan

[73] Assignee: Ricoh Company, Ltd., Tokyo, Japan

[21] Appl. No.: 93,368

[22] Filed: Sep. 4, 1987

[30] Foreign Application Priority Data

Sep. 5, 1986 [JP] Japan ................................. 61-209811
Sep. 16, 1986 [JP] Japan ................................. 61-217785
Mar. 20, 1987 [JP] Japan ................................. 62-66834

[51] Int. Cl.⁴ .......................... G11B 7/12; G11B 7/135
[52] U.S. Cl. ........................................ 369/110; 369/45; 369/112
[58] Field of Search ..................... 369/44, 45, 46, 110, 369/112, 121, 122; 350/96.11–96.14, 96.18, 96.19

[56] References Cited

U.S. PATENT DOCUMENTS 4,716,559  12/1987  Hine ................................. 369/112
4,760,568  7/1988  Hine ................................. 369/112

FOREIGN PATENT DOCUMENTS 58-130448  8/1983  Japan .
63-61430  3/1988  Japan .

OTHER PUBLICATIONS

Ura et al., *An Integrated-Optic Disk Pickup Device*, May 1986, pp. 92–100, Electronics and Communications in Japan, Part 2, vol. 70, No. 2, © 1987, Scripta Technica, Inc.

Takizawa, *Electrooptic Fresnel Lens-Scanner With An Array Of Channel Waveguides*, Applied Optics, vol. 22, No. 16, Aug. 15, 1983.

Primary Examiner—Alan Faber
Assistant Examiner—James E. Tomassini
Attorney, Agent, or Firm—Cooper & Dunham

[57] ABSTRACT

An optical pick-up for use in an optically information recording and reproducing apparatus is provided. The pick-up includes a substrate on which an optical waveguide layer is formed and a grating coupler is formed on the optical waveguide layer. Photosensors are also provided to receive light travelling along the waveguide from the grating coupler. A beam splitter is also formed on the substrate for splitting the light from the grating coupler into two separate light beams before reception by the photosensors. If the substrate is opaque, the substrate is formed with an opening through which light emitted from a light source passes. An objective lens is also provided for focusing the light emitted from the light source onto the information recording surface of an optical disc. A quarter wavelength plate may also be provided to change the nature of polarization of the light used.

26 Claims, 16 Drawing Sheets

MONOLITHIC OPTICAL PICK-UP USING AN OPTICAL WAVEGUIDE

BACKGROUND OF THE INVENTION

1. Field of the Invention

This invention generally relates to a device for optically recording and/or reproducing information, and, in particular, to an monolithic optical pick-up for optically recording or reproducing information on or from a recording medium, such as an optical disk.

2. Description of the Prior Art

A typical prior art optical pick-up for use in an optical information recording/reproducing apparatus is schematically shown in FIG. 28. As shown, a divergent light flux emitted from a semiconductor laser 1 is, for example, separated into three beams by a diffraction grating 2. These light fluxes, after passing through a polarizing beam splitter 3, pass through a ¼ wavelength plate 4 to become circularly polarized and then focused onto the information recording surface of an optical disk 6 as a recording medium by means of an objective lens 5. Then, the light flux reflecting from the information recording surface of the optical disk 6, after passing through the objective lens 5, passes through the ¼ wavelength plate 4 to become linearly polarized and is again introduced into the polarizing beam splitter 3. The polarizing beam splitter 3 causes the reflecting light from the information recording surface of the optical disk 6 to be reflected sideways to thereby separate it from the incident light, and the light thus reflected by the beam splitter 3 passes through a cylindrical lens 7 to be lead into a photodetector 8. A detection signal output from the photodetector 8 is processed not only as an information read-out signal, but also as an auto-focusing signal for keeping light from a light source to be always focused on the information recording surface of the optical disk and as a tracking signal for adjusting the position of the optical pick-up such that the convergent light toward the information recording surface of the optical disk is always focused onto an information track on the information recording surface.

However, in such a prior art optical pick-up, since use is made of a cubic polarizing beam splitter 3, which is a relatively bulky optical component, the device as a whole tends to be large in size and in weight. For this reason, there are such disadvantages as long access time, high manufacturing cost and insufficient mechanical stability.

In order to obviate such disadvantages, for example, Japanese Patent Laid-open Pub. No. 61-92439 discloses an idea to provide a light source, a grating type collimating element and a grating type light condensing element for condensing light onto a recording medium, a grating beam splitter element for separating the reflecting light flux from the recording medium, and a light flux separating and condensing element for condensing the separated light to a photodetector on the same substrate in a monolithic structure; on the other hand, Japanese Patent Laid-open Pub. No. 61-178740 teaches to form a beam splitter for separating the reflecting light from the recording medium from the incident light from a diffraction grating arranged perpendicular to the optical axis However, in the former case, since a semiconductor laser serving as the light source is directly coupled to an optical waveguide, the coupling efficiency to the optical waveguide cannot be enhanced (approximately 3%), so that the use rate of light is significantly poor. For this reason, light having sufficient power cannot reach the information recording surface, and, thus, recording and/or reproducing operations with high S/N ratio cannot be carried out. In particular, in information recording operations, since large recording power is required, this cannot be adopted virtually. In addition, when the oscillating wavelength of a beam from a semiconductor laser as a light source fluctuates by the so-called mode hopping phenomenon which results from the temperature dependent characteristic, it is affected directly to cause the convergent light toward the information recording surface to be shifted away from an information track, thereby creating a problem of incapability to carry out recording and/or reproducing information accurately.

Also in the latter case, since the reflecting light from the information recording surface is diffracted toward a photodetector by a diffraction grating, when the oscillating wavelength of a beam from a semiconductor laser as a light source fluctuates due to the mode hopping phenomenon, the diffraction angle also fluctuates along therewith, so that fluctuations are produced in the position of the convergent light on the photodetector, thereby making it difficult to carry out recording and-/or reproducing of information stably.

SUMMARY OF THE INVENTION

In accordance with the present invention, there is provided a device for optically writing or reading information to or from a recording medium, which comprises integrated beam splitting means including a substrate, a grating formed on said substrate for causing light entering in a first direction to pass therethrough and causing light entering in a second direction to be diffracted and an optical waveguide for guiding said diffracted light to a predetermined location, whereby said substrate is provided with an opening in positional alignment with said grating. Thus, even if the substrate is comprised of an opaque material, the light may pass through the opening of the substrate and then through the grating in the first direction. In the preferred embodiment of the present invention, the substrate is generally plate-shaped and a layer of the optical waveguide is formed on the substrate with or without a buffer layer therebetween. And, the diffraction grating is formed on the optical waveguide layer in registry in position with the opening formed in the substrate.

A light source, preferably a semiconductor laser, is disposed and the light from the light source passes through the opening of the substrate and then through the diffraction grating in the first direction without diffraction. Preferably, a quarter wavelength plate is disposed above the diffraction grating and a focusing lens is disposed above the quarter wavelength plate. Thus, in the preferred arrangement, the light passing through the diffraction grating passes through the quarter wavelength plate and then the focusing lens to be focused onto the information recording surface of a recording medium, such as an optical disk. The light reflecting from the optical disk passes through the focusing lens and then the quarter wavelength plate and then it enters the diffraction grating in the second direction, where the reflecting light is diffracted to be guided into the optical waveguide. Thus, the diffracted light is guided along the optical waveguide to a predetermined location where beam splitting means is provided. Thus, the light is split into two beams which are then directed to respective photodetecting means. In the preferred embodiment, the beam splitting means and the photodetecting means are also formed on said substrate in a monolithic structure.

It is therefore a primary object of the present invention to obviate the disadvantages of the prior art and to provide an improved device for optically writing or reading information to or from a recording medium.

Another object of the present invention is to provide an improved optical information writing/reading device compact in size and stable and reliable in operation.

A further object of the present invention is to provide an improved optical pick-up suitable for use in an optical information recording/reproducing apparatus.

A still further object of the present invention is to provide an improved optical pick-up in which some components are integrated to reduce the total number of separate components.

A still further object of the present invention is to provide an improved optical pick-up which is easy to manufacture and less susceptible to positional misalignment.

Other objects, advantages and novel features of the present invention will become apparent from the following detailed description of the invention when considered in conjunction with the accompanying drawings.

DESCRIPTION OF THE PREFERRED EMBODIMENTS

Figure 1:
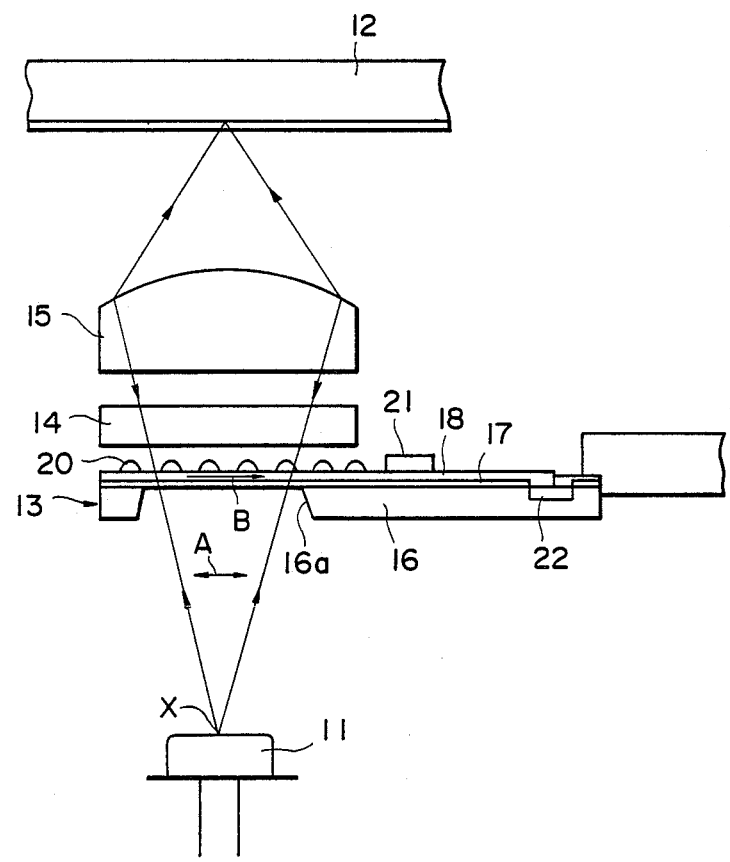
FIG. 1 is a schematic illustration showing the overall structure of an optical pick-up constructed in accordance with one embodiment of the present invention.
Figure 2:
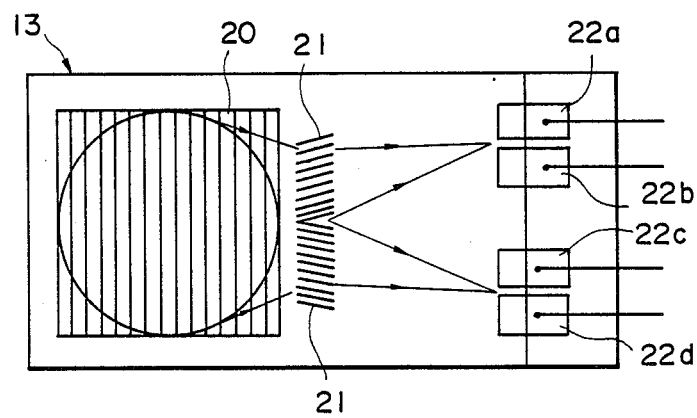
FIG. 2 is a schematic illustration showing in plan view the structure of the optical waveguide element 13 provided in the optical pick-up of FIG. 1.

Referring now to FIGS. 1 and 2, there is shown schematically an optical pick-up for use in an optical image information recording/reproducing apparatus. As shown, between a semiconductor laser 11 as a light source and an optical disk 12 as a recording medium is disposed in series an optical waveguide element 13, a quarter wavelength plate 14 and an objective lens 15 as spaced apart from each other in the order mentioned from bottom to top. The optical waveguide element 13 includes an opaque substrate 16, which is preferably comprised of a semiconductor material, a metal or an insulating material, a buffer layer 17 formed on the top surface of the substrate 16 and an optical waveguide layer 18 formed on the buffer layer 17. These layers 17 and 18 may be formed, for example, by evaporation, sputtering, or CVD one on top of the other, and they are disposed substantially vertical to the optical axis of the optical pick-up. In the illustrated embodiment, the optical waveguide element 13 is structured such that the optical waveguide layer 18 serves as a single mode optical waveguide. That is, in this case, only the fundamental mode is transmitted along this optical waveguide and thus it is not affected at all by changes in wavelength in the order of several nanometers. It is to be noted, however, that the present invention should not be limited only to the single mode structure. The present invention may also be so structured to have a multi-mode optical waveguide.

The buffer and optical waveguide layers 17 and 18 may be preferably comprised of a transparent material, such as a dielectric material like glass $SiO_2$, $Si_3N_4$; $Nb_2O_5$ and $Ta_2O_5$ and an organic material like polymer. The buffer layer 17 is provided to reduce the loss of transmitting light from the optical waveguide layer 18, and, for this purpose, the buffer layer 17 is required to have a refractive index smaller than that of the optical waveguide layer 18. However, if the waveguide loss is negligibly small, then it may not be necessary to provide the buffer layer 17.

Importantly, the opaque substrate 16 is formed with an opening 16a, or through-hole in the illustrated embodiment, at a location of the substrate 16 where light is irradiated so as to allow the irradiate light to pass therethrough at least partly. The opening 16a may be formed, for example, by dry or wet etching, grinding, ion milling, or any other conventional methods. In addition, a grating coupler 20 serving as a diffraction grating is provided at the top surface of the optical waveguide layer 18 and above the opening 16a, thus facing the quarter wavelength plate 14. In the illustrated embodiment, the grating coupler 20 is comprised of a surface relief type grating which includes an equi-distant linear grating. This grating coupler 20 has an extremely low diffraction efficiency against the light emitted from the semiconductor laser 11, which is the P polarization light oscillating in the direction indicated by A in FIG. 1 and an extremely high diffraction efficiency against the light reflecting from the information recording surface of the optical disk 12, which is the S polarization light. Thus, the light emitted from the semiconductor laser 11 substantially passes through the grating coupler 20 virtually without diffraction to be finally focused upon the image recording surface of the optical disk 12, and the light reflecting from the optical disk 12 is substantially diffracted by the grating coupler 20 to be lead into the optical waveguide layer 18. Thus, the grating coupler 20 has a very small coupling efficiency for the light advancing vertically upward as emitted from the semiconductor laser 11; on the other hand, the grating coupler 20 has a very large coupling efficiency for the light advancing vertically downward as reflecting from the optical disk 12.

Furthermore, a pair of grating beam splitters 21, 21 is provided on the optical waveguide layer 18 adjacent to the grating coupler 20. Each of the pair of grating beam splitters 21, 21 includes an equi-distant linear grating as a split diffraction grating. These grating beam splitters 21, 21 are arranged with different diffraction angles, so that the diffracted light from the grating coupler 20 is split into two separate light fluxes. These split light fluxes are then directed to respective photodetectors which will be described later in detail. In this case, the light travelling inside of the optical waveguide has been made convergent by the objective lens 15, so that the focusing point on each of the photodetectors is optically equivalent to the light emitting point (shown as X in FIG. 1) of the semiconductor laser 11. Thus, if the grating beam splitters are so structured to have a focusing function, the distance to the focusing point may be made shorter.

The opaque substrate 16 is also provided with two pairs of photodetectors 22a–22b and 22c–22d as buried therein and in contact with the terminal end of the optical waveguide layer 18, which is located near the right-hand side portion of the substrate 16 in FIG. 1. As shown in FIG. 2, these two pairs of photodetectors 22a through 22d are arranged side-by-side with a gap between the pairs. In the case where the opaque substrate 16 is comprised of a semiconductor material, such as Si, then each of these photodetectors 22a through 22d may be made as a photodiode by forming diffusion regions inside of the substrate 16. On the other hand, if the opaque substrate 16 is comprised of an insulating material or a metal, then such photodiodes may be formed on the optical waveguide layer 18. The provision of photodetectors 22 as buried inside of or on the substrate 16 as described above is advantageous because the photodetectors 22 may be incorporated into a monolithic structure, which is sturdy in structure. Besides, in such a monolithic structure, there is no need to polish the end surface of each of the photodetectors 22 as required in the prior art structure. The light signal received by these photodetectors 22 is processed as a recorded information read-out signal, an auto-focusing signal and a tracking signal.

In such an embodiment, the divergent light flux emitted from the semiconductor laser 11 passes through the opening 16a of the optical waveguide element 13 and enters the grating coupler 20. In this case, since the light entering the grating coupler 20 from below is P polarization light, the light passes through the grating coupler 20 virtually without diffraction, and, thereafter, the light passes through the quarter wavelength plate 14 to become circular polarization light which is focused onto the information recording surface of the optical disc 12 by means of the objective lens 15. As described above, since it is so structured that the light emitted from the semiconductor laser 11 passes through the opening 16a of the opaque substrate 16, the substrate 16 is not limited to a transparent material, so that the optical waveguide element 13 may be made light in weight, low at cost and easy to manufacture. In addition, a desired material may be selected to make the optical waveguide element 13 high in durability and degree of integration.

The light flux reflecting from the information recording surface of the optical disc 12 passes through the objective lens 15 to thereby become a convergent light flux which then passes through the quarter wavelength plate 14 to become an S polarization light flux which, in turn, enters the grating coupler 20 from above. Since the grating coupler 20 has a high diffraction efficiency for the S polarization light entering from above, the light is efficiently diffracted and introduced into the optical waveguide layer 18 as indicated by the arrow B in FIG. 1, so that the reflecting light from the information recording surface is separated from the irradiation light from the semiconductor laser 11. In the illustrated embodiment, since the optical waveguide layer 18 is formed as a single mode optical waveguide, only the fundamental mode propagates along the optical waveguide, and, thus, the light diffracted by the grating coupler 20 propagates in the direction substantially in parallel to the surface of the grating. The light travelling along the optical waveguide is split into two light fluxes by means of the grating beam splitter 21, and each of the split light fluxes is directed to an intended pair of photodetectors 22. When the optical disc 12 is located at a predetermined reference position, each of the split light fluxes is focused onto the center between the paired photodetectors 22.

Denoting output signals from the photodetectors 22a, 22b, 22c and 22d by a, b, c and d, respectively, a focusing error signal df can be expressed by $$df=(a+d)-(b+c)$$

Figure 3A:
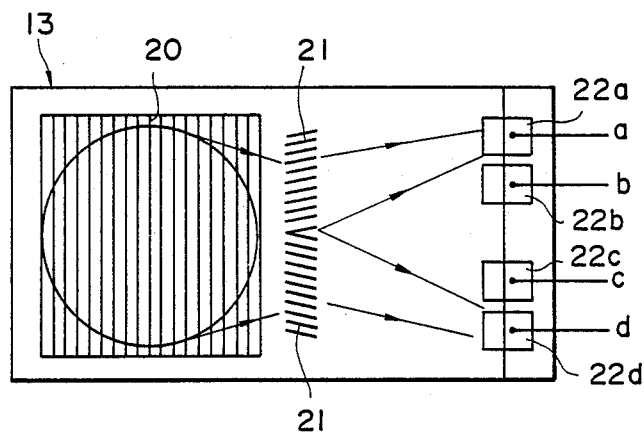
FIGS. 3a and 3b are schematic illustrations which are useful for understanding the operation of the optical pick-up shown in FIGS. 1 and 2.
Figure 3B:
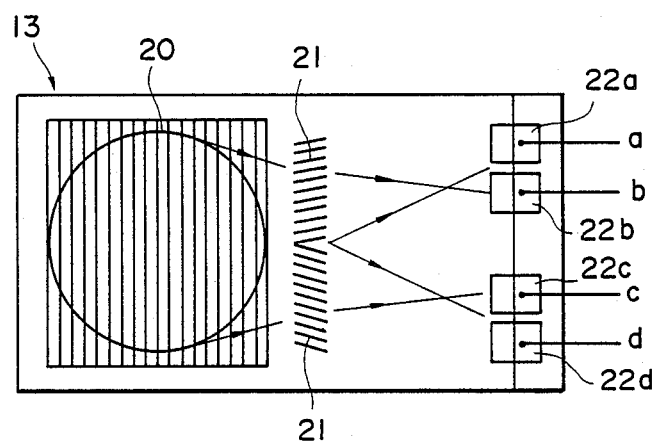

That is, when the optical disc 12 is located at its predetermined reference position, the conditions of a=b and c=d hold, so that df=0. On the other hand, if the optical disc 12 is located closer to the pick-up, the split light fluxes are shifted in position as shown in FIG. 3a, thereby providing the condition of a being larger than b and c being smaller than d, which causes df to be larger than 0. On the contrary, when the optical disc 12 is located further away from the optical pick-up, the split light fluxes are shifted as shown in FIG. 3b, so that the conditions of a being smaller than b and c being larger than d hold to cause df to be smaller than 0. Thus, the direction of focussing error can be determined depending on the sign of df, and the objective lens 15 is moved closer to or further away from the optical disc 12 so as to obtain the condition of df=0 at all times by means of an actuator (not shown) to thereby carry out an auto-focusing control operation.

On the other hand, a tracking error signal dt can be determined by the following equation.

$$dt=(a+b)-(c+d)$$

That is, if a light spot formed on the information recording surface of the optical disc 12 is located on an information track, such as a series of pits, on the information recording surface, the condition of dt=0 holds; whereas, if the light spot is shifted in position from the information track, dt becomes either larger than 0 or smaller than 0. Thus, depending on the sign of dt, the direction of tracking error can be determined. And, it is so structured that the objective lens 15 is moved relative to the optical disc 12 in the direction normal to the information track on the information recording surface by means of an actuator (not shown) so as to obtain the condition of dt=0. This is an auto-tracking control operation.

In addition, as a recorded information read-out signal S of the information recorded on the optical disc 12, it can be obtained as a sum of all of the outputs from the four photodetectors 22a through 22d.

$$S=a+b+c+d.$$

Figure 4:
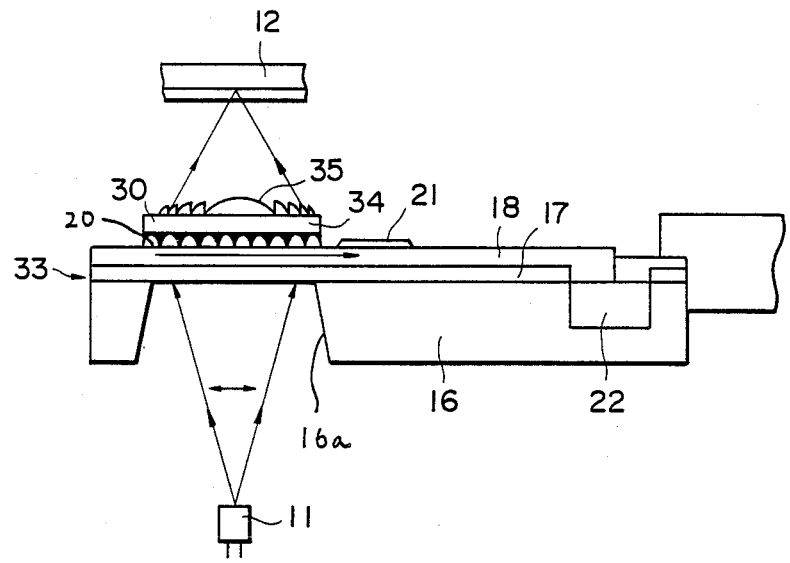
FIGS. 4 through 15 are schematic illustrations showing various modifications constructed in accordance with various embodiments of the present invention.

FIG. 4 shows an optical pick-up device constructed in accordance with another embodiment of the present invention. In the present embodiment, use is made of a micro Fresnel lens 35 as an objective lens, which is provided on a quarter wavelength plate 34 as adhesively fixed thereto, which, in turn, is provided on a grating coupler 30 as adhesively fixed thereto. The grating coupler 30 is formed on the optical waveguide layer 18 of an optical waveguide element 33. Thus, in the present embodiment, the micro Fresnel lens 35 and the quarter wavelength plate 34 are also integrally formed on the substrate 16 of the optical wavelength element 33. That is, all of the components excepting the semiconductor laser 11 are integrated in the form of a unit structure. Thus, the present embodiment allows to make the entire structure more compact in size.

Figure 5:
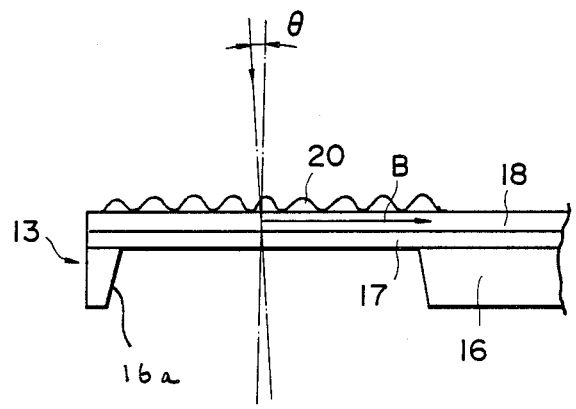

As shown in FIG. 5, if the optical waveguide element 13 or 33 is arranged as inclined at a predetermined angle θ with respect to the optical axis, which is vertical in the illustrated embodiment, all of the diffracted light may be caused to travel in the direction indicated by the arrow B while eliminating the diffracted light traveling in the direction opposite to the direction B almost completely. In this instance, it is only necessary to determine the grating constant so as to satisfy the following condition.

$$nk \cdot \sin\theta + gK = Nk$$

where,
$k=2\pi/\lambda$
$K=2\pi d$
λ: wavelength of the light;
d: grating constant;
n: refractive index of the air;
N: equivalent refractive index of the optical waveguide;
q: integer.

If it is so structured to satisfy the above equation, there is obtained an increased coupling efficiency while preventing the diffracted light from travelling in the opposite and thus undesired direction.

Figure 6:
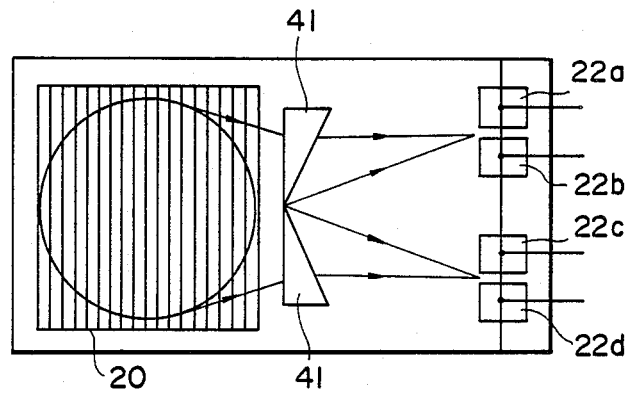

FIG. 6 shows a further embodiment of the present invention, in which provision is made of a pair of thin film prisms 41 and 41 in place of the grating beam splitter 21. The thin film prisms 41 may be formed from a material having a refractive index higher than that of the optical waveguide layer 18, such as $TiO_2$. The pair of thin film prisms 41 and 41 also allows to obtain the similar function and effects so that the diffracted light travelling along the optical waveguide layer 18 may be split into two separate light beams.

Figure 7:
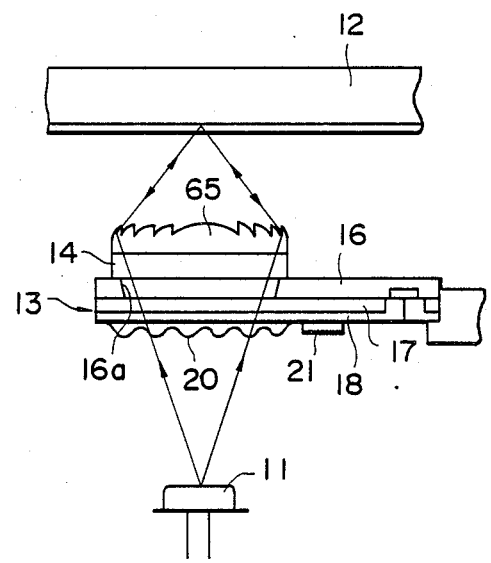

FIG. 7 shows a still further embodiment of the present invention, in which use is made of a micro Fresnel lens 65 as an objective lens and the optical waveguide element 13 is turned upside down with the quarter wavelength plate 14 and the micro Fresnel lens 65 are placed one on top of another on the optical waveguide element 13 in registry in position with the opening 16a. The micro Fresnel lens 65 and the quarter wavelength plate 14 are adhesively fixed together and also to the optical waveguide element 13 to define an integrated structure.

Figure 8:
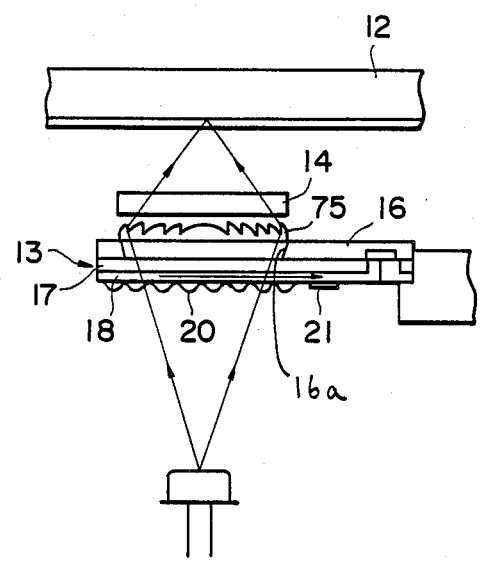

FIG. 8 shows a still further embodiment of the present invention, in which a micro Fresnel lens 75 is used as an objective lens as adhesively fixed to the bottom of the substrate 16 in registry in position with the opening 16a. In the present embodiment, the quarter wavelength plate 14 is not integrated but provided as separately from the optical waveguide element 13. It is to be noted that the quarter wavelength plate 14 is disposed between the micro Fresnel lens 75 and the optical disc 12.

Figure 9:
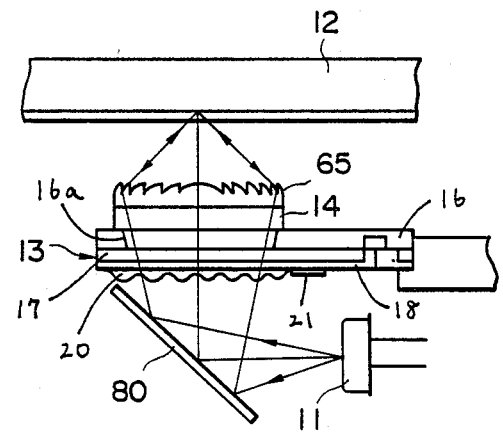

FIG. 9 shows a sill further embodiment of the present invention, in which a plane mirror 80 is disposed below the optical waveguide element 13 such that the light emitted from the semiconductor laser 11 is reflected by the plane mirror 80 to pass through the opening 16a of the optical waveguide element 13. Such a structure is advantageous in making the vertical size of the optical pick-up device shorter. In the illustrated embodiment, the light emitted from the semiconductor laser 11 is deflected at right angles by the plane mirror 80; however, the angle of reflection may be set arbitrarily. In addition, two or more reflecting mirrors can be provided to provide a multiple of reflections before being applied to the optical waveguide element 13.

Figure 10:
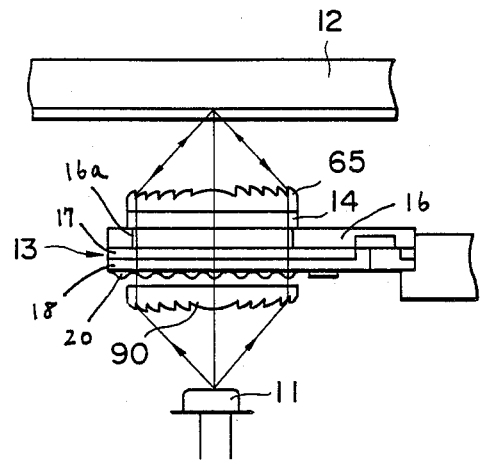

FIG. 10 shows a still further embodiment of the present invention, in which the optical waveguide element 13 is turned upside down with its grating coupler 20 located at its bottom and its opening 16a located at its top. A quarter wavelength plate 14 is provided on the optical waveguide element 13 in registry in position with the opening 16a and adhesively fixed thereto, and a micro Fresnel lens 65 serving as an objective lens is provided on the quarter wavelength plate 14 as adhesively affixed thereto. Thus, the quarter wavelength plate 14 and the micro Fresnel lens 65 are integrated with the optical waveguide element 13. A collimating lens 90 in the form of a Fresnel lens is also disposed between the semiconductor laser 11 and the optical waveguide element 13, so that the light emitted from the semiconductor laser 11 is collimated by the collimator lens 90 before being applied to the optical waveguide element 13, so that a light spot of smaller diameter can be formed on the information recording surface of the optical disc 12.

Figure 11:
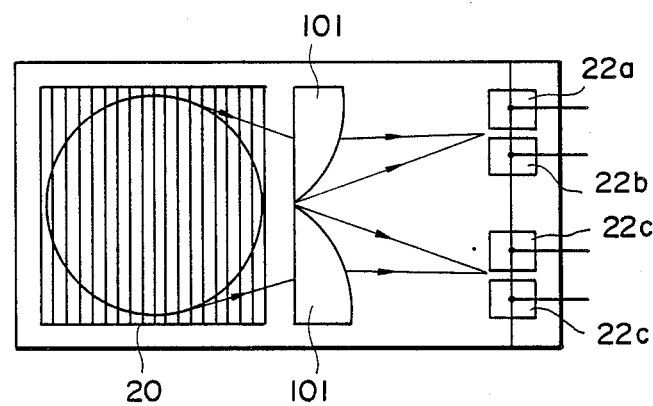
Figure 12:
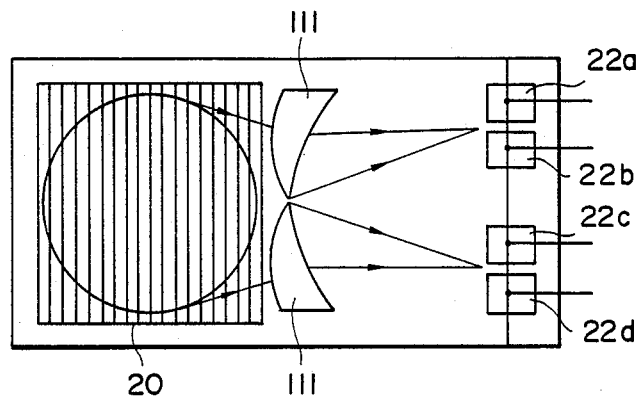

Now, returning to the embodiment shown in FIG. 6, this embodiment may be used only when the light travelling along the optical waveguide layer 18 is convergent. Thus, if the light travelling along the optical waveguide layer 18 is weakly convergent or non-convergent, then focusing means for focusing the light travelling along the optical waveguide layer 18 must be provided. FIG. 11 shows a still further embodiment using a pair of thin film lenses 101 and 101 having a focusing function for the light travelling along the optical waveguide layer 18. The thin film lens 101 has a flat inlet surface and a curved, spherical or non-spherical, outlet surface, and, thus the light travelling along the optical waveguide layer 18 can be split into two separate and convergent beams by means of the pair of thin film lenses 101 and 101. FIG. 12 shows a still further embodiment of the present invention, in which a pair of thin film lenses 111 and 111 is provided. In this embodiment, the thin film lens 111 has both curved inlet and outlet surfaces with different radii of curvature. The curved inlet and outlet surfaces may be either spherical or non-spherical. Such a structure is advantageous because adjustments of lens power and correction of abbreviation can be carried out with ease. Thus, the present embodiment is particularly advantageous for the case in which the difference in refractive index between the thin film lens 111 and the optical waveguide layer 18 is limited.

Figure 13:
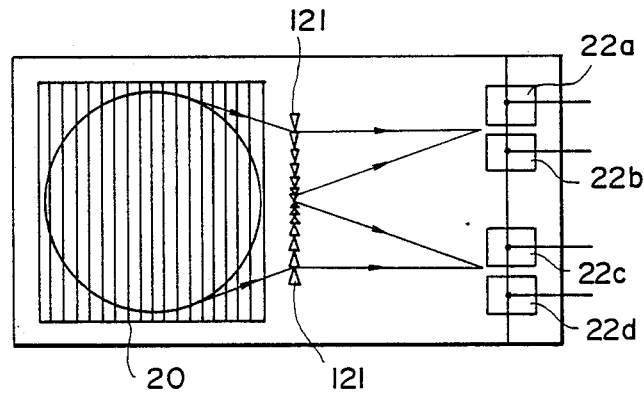

FIG. 13 shows a still further embodiment of the present invention, in which use is made of a pair of thin film Fresnel lenses 121 and 121. This embodiment also allows to obtain the similar functional effects as those of the previously described embodiments. In these thin film waveguide lenses or thin film waveguide Fresnel lenses, use may be made of the refractive index distribution type as well as the thickness distribution type. In the case of the refractive index distribution type, a lens is formed by causing a material whose refractive index differs from the refractive index of the optical waveguide to be diffused into the optical waveguide in a particular distribution.

Figure 14:
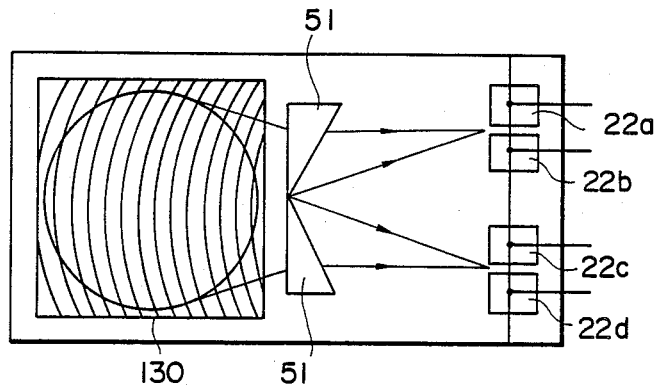
Figure 15:
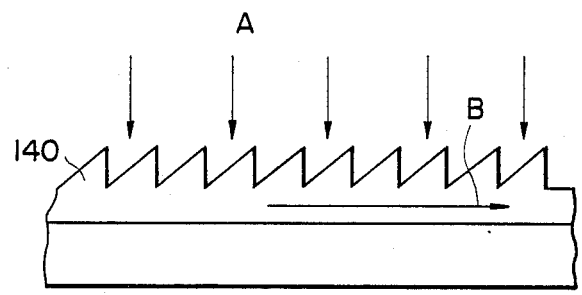

FIG. 14 shows a still further embodiment of the present invention, in which a grating coupler 130 is formed from a curved grating so as to make the diffracted light to be more strongly convergent. FIG. 15 shows a still further embodiment of the present invention, in which a grating coupler 140 has a serrated cross sectional shape which is non-symmetrical. With such a grating coupler 140, the light entering into the grating coupler 140 as advancing in the direction indicated by the arrow A is made almost entirely to travel in the direction indicated by the arrow B by the diffraction action provided by this grating coupler 140. Thus, such a structure is effective in obtaining an increased light output efficiency.

In the above-described embodiments, the grating couplers employed were all of the surface relief type; however, it is to be noted that the present invention should not be limited only to the surface relief type, and use may also be made of any type of grating, such as the volume phase type and amplitude type.

Figure 16:
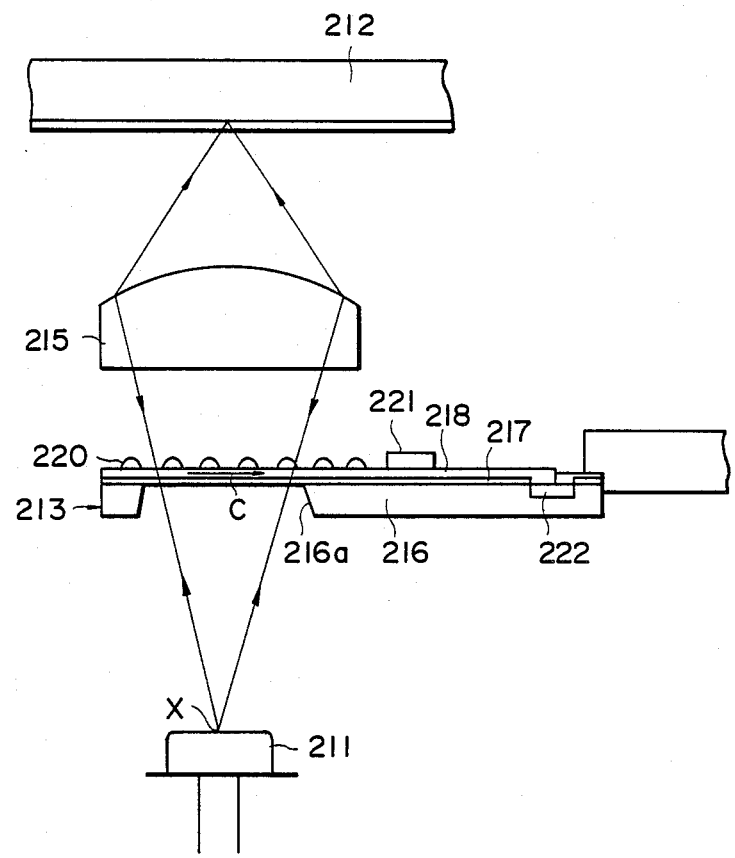
FIG. 16 is a schematic illustration showing the overall structure of an optical pick-up constructed in accordance with another embodiment of the present invention and having no quarter wavelength plate.

FIG. 16 shows schematically an optical pick-up device constructed in accordance with another embodiment of the present invention and having no quarter wavelength plate. It should be noted that the present embodiment is structurally very similar to the embodiment of FIG. 1 excepting the fact that no quarter wavelength plate is provided in the present embodiment. As a light source, use has been made of a semiconductor laser 211 in the present embodiment; however, use may also be made of any other type of a laser, such as a He-Ne laser. Between the semiconductor laser 211 as a light source and an optical magnetic disc 211 are disposed an optical waveguide element 213 and an objective lens 215 as spaced apart from each other. The optical waveguide element 213 includes an opaque substrate 216, which may be comprised of a semiconductor, a metal or an insulating material, a buffer layer 217 formed on the substrate 216, and an optical waveguide layer 218 formed on the buffer layer 217. These buffer and waveguide layers 217 and 218 may be made by any well-known methods, such as evaporation, sputtering and CVD, and the optical waveguide element 213 is disposed to extend substantially perpendicular to the optical axis of the optical pick-up. In the present embodiment, the optical waveguide layer 218 is so formed as a single mode waveguide, so that only the fundamental mode propagates along the waveguide layer 218, in which case no adverse affects are produced by changes in wavelength in the order of several nanometers. It is to be noted, however, that the waveguide layer 18 may also be so formed as a multi-mode waveguide, if desired.

The buffer and waveguide layers 217 and 218 may be made from a transparent material, such as a dielectric material like glass, $SiO_2$, $Si_3N_4$, $Nb_2O_5$ and $Ta_2O_5$, or an organic material like polymer. The buffer layer 217 is provided to reduce the waveguide loss of the optical waveguide layer 218 and thus the refractive index of the buffer layer 217 must be chosen to be smaller than the refractive index of the optical waveguide layer 218. However, if the waveguide loss is not a problem, then the buffer layer 217 may be omitted. In addition, if desired, the buffer layer 217 may be provided on the optical waveguide layer 218, which also allows to reduce the waveguide loss of the waveguide layer 218. In addition, the substrate 216 is formed with an opening or through-hole 216a at an irradiation location where the light emitted from the semiconductor laser 211 is irradiated, so that the light emitted from the semiconductor laser 211 may pass through the substrate 216. Such an opening 216a may be formed, for example, by dry or wet etching, grinding, ion milling, or any other well-known methods. Instead of forming such an opening 216a, the opaque substrate 216 may be made transparent partially, for example, by thermal oxidation, laser annealing and polishing. Alternatively, such a method of making the opaque substrate 216 partially transparent may be used in combination with the method of providing an opening in the substrate 216.

A grating coupler 220 as a diffraction grating for causing exterior light to be optically coupled to the optical waveguide layer 218 is provided on the optical waveguide layer 218 in registry in position with the opening 216a and facing the objective lens 215. In the present embodiment, the grating coupler 220 is a grating of the surface relief type including an equi-distant linear grating. With this structure, the light emitted from the semiconductor laser 211 partly passes through the grating coupler 220 and the rest of the emitted light is diffracted into the optical waveguide layer 218, and the reflecting light from the optical disc 212 is partly diffracted into the optical waveguide laser 218 with the rest allowed to pass through the grating coupler 220. It should be noted that the grating coupler 220 does not need to be an equi-distant grating and it can be any other grating. In addition, the grating coupler 220 does not need to be a linear grating, and it can be a curved grating to provide a focusing function. Besides, the grating coupler 220 may be so structured to have local grating segments having different orientations so as to provide a light splitting function. Moreover, the grating coupler 220 does not need to be of the surface relief type, and the cross sectional shape of the grating coupler 220 may be determined arbitrarily. In addition, use may also be made of a grating of the refractive index distribution modulation type and the volume phase type. Such gratings can be formed various methods, including diffusion and built-in methods. On the other hand, in the case where an opto-acoustic element, such as $LiNbO_3$, is used for the optical waveguide layer and/or the buffer layer, use may be made of a grating by elastic surface waves.

Moreover, on the optical waveguide layer 218 is provided a pair of optical waveguide lens beam splitters 221 and 221, each including an equi-distant linear grating as a splitter diffraction grating, adjacent to the grating coupler 220. This pair of beam splitters 221 serves to split the diffracted light from the grating coupler 220 into two separate light fluxes and to have these two separate light fluxes directed to respective photodetectors. The beam splitters 221 may be of the mode index type or the refractive index distribution type. In order to provide a lens function to the beam splitter 221, use may be made of the Fresnel lens type, geodesic lens type, Lunerberg lens type, or the like other than the non-spherical surface type. Besides, in the case where the grating coupler 220 is structured to have a focusing function or to be of the split grating type, the beam splitters 221 may be omitted.

Figure 17:
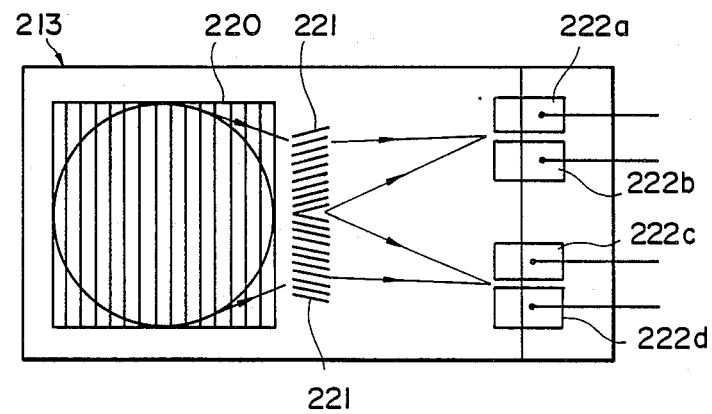
FIG. 17 is a schematic illustration showing in plan view the structure of the optical waveguide element 213 provided in the optical pick-up of FIG. 16.

The opaque substrate 216 is provided with four photodetectors 222 as buried therein and in contact with the terminal end portion of the optical waveguide layer 218. In particular, as shown in FIG. 17, these photodetectors 222 are grouped into two pairs as spaced apart from each other with one pair including the photodetectors 222a and 22b with the other pair including the photodetectors 222c and 222d. These photodetectors 222a through 222d may be formed from photodiodes or the like. In the case where the opaque substrate 216 is comprised of a semiconductor material, such as Si or GaAs, these photodetectors 222 may be formed, for example, by introducing impurities into the substrate 216 by diffusion or ion implantation. With the provision of the photodetectors 222 buried in the substrate 216 in this manner, there can be provided a monolithic structure which is sturdy in structure and which does not require to polish the end surface as different from the prior art. On the other hand, if the opaque substrate 216 is formed from an insulating material or a metal, the photodiodes 222 may be formed from photodiodes provided on the optical waveguide layer 218. A light signal detected by these photodetectors 222 is processed to produce a recorded information read-out signal, an auto-focusing signal and a tracking signal.

In this embodiment, the divergent light flux emitted from the semiconductor laser 211 is incident upon the grating coupler 220 through the opening 216a of the optical waveguide element 213 and it partly passes through the grating coupler 220 with the rest being diffracted and thus coupled into the optical waveguide layer 218. The light passing through the grating coupler 220 is focused onto the information recording surface of the optical disc 212 as a recording medium by means of the objective lens 215. As described above, it is so structured that the light emitted from the semiconductor laser 211 passes through the opening 216a of the opaque substrate 216, the substrate 216 is not limited to be transparent and can be made from any desired material, which contributes to make the entire device light in weight and low at cost and to enhance processibility, thereby permitting to provide an optical pick-up having an excellent durability and high density.

The light reflecting from the information recording surface of the optical disc 212 passes through the objective lens 215 to become a convergent light flux which again enters the grating coupler 220. And, a part of the light reflecting from the information recording surface is diffracted and thus coupled into the optical waveguide layer 218 with the rest passing through the grating coupler 220 without diffraction. That is, because of the diffraction function of the grating coupler 220, as shown by the arrow C in FIG. 16, travelling light is excited inside of the optical waveguide layer 218 to thereby pick up the modulated light reflecting from the information recording surface. In this case, the light diffracted by the grating coupler 220 is caused to propagate in the direction substantially parallel to the grating surface. This travelling light is split into two separate light fluxes by the grating beam splitters 221 with each light flux being directed to its corresponding pair of photodetectors 222. And, when the optical disc 212 is located at a predetermined reference position, each of the split light fluxes is directed to the center of each of paired photodetectors 222a and 222b or 222c and 222d. And, the recorded information read-out signal may be obtained as a sum of all of the outputs from the four photodetectors 222a through 222d. In addition, autofocusing control and auto-tracking control operations are carried out depending on whether the optical disc 212 is located closer to or separated away from the optical pick-up and whether or not a light spot irradiated to the information recording surface of the optical disk 212 is aligned with an information track, such as a series of pits, of the information recording surface (see FIGS. 3a and 3b).

Also in the present embodiment, the optical waveguide element 213 may be disposed upside down, and the optical waveguide element 213 may be disposed between the objective lens 215 and the optical disc 212 with the optical waveguide element 213 rightside up or upside down. In addition, if a collimator lens is disposed between the semiconductor laser 211 as a light source and the optical waveguide element 213, the light incident upon the optical waveguide element 213 may be made substantially collimated. With this structure, adjustments of the optical axis can be carried out with ease and at high accuracy, and a smaller light spot can be formed on the optical disc 212.

Figure 18:
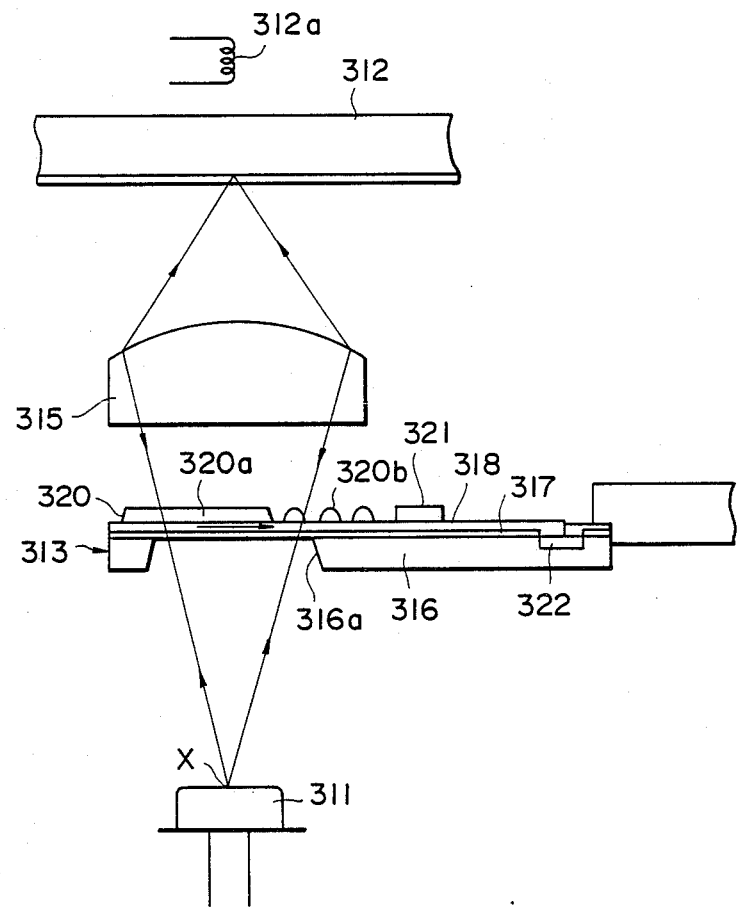
FIG. 18 is a schematic illustration showing the overall structure of an optical pick-up constructed in accordance with a further embodiment of the present invention for application to an optical disk as a recording medium.
Figure 19:
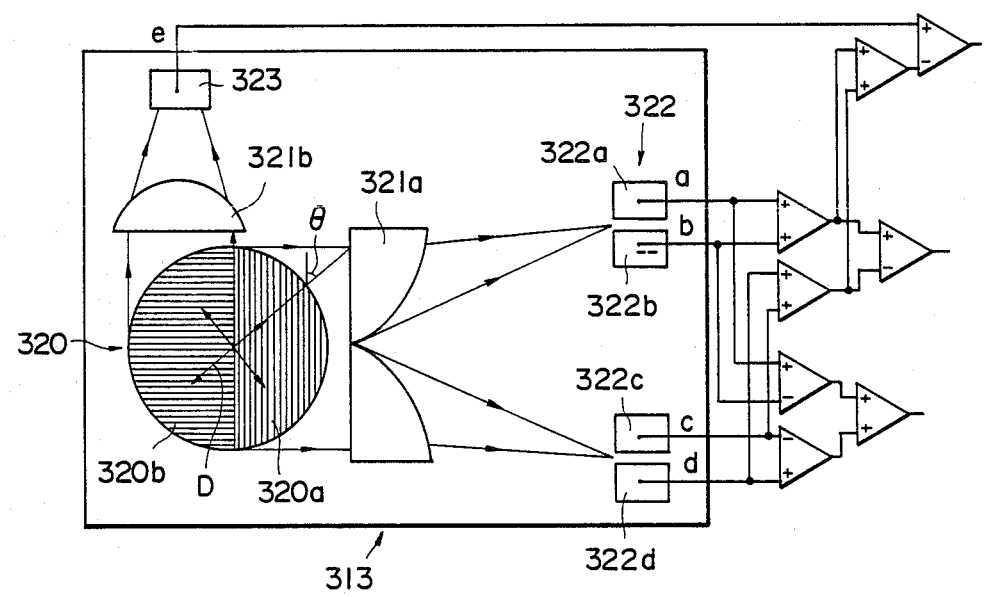
FIG. 19 is a schematic illustration showing in plan view an optical waveguide element 313 provided in the optical pick-up of FIG. 18.

FIGS. 18 and 19 show an embodiment which uses an opto-magnetic disc as a recording medium. Between a semiconductor laser 311 as a light source and an opto-magnetic disc 312 as a recording medium are disposed an optical waveguide element 313 and an objective lens 315 as spaced apart from each other in the order mentioned from bottom to top along the optical axis of the present optical pick-up. An electromagnet 312a for generating a bias magnetic field is disposed at the rear side surface of the opto-magnetic disc 312. As the light source, use may also be made of a He-Ne laser or any other type of laser than the semiconductor laser. The light emitted from the light source is preferably polarized linearly. The electromagnet 312a is provided for applying a magnetic field across the disc 312 so as to carry out recording or erasure of information and use may also be made of a permanent magnet. Alternatively, the electromagnet 312a may be disposed at the front surface side of the disc 312, where the information recording surface is defined, if desired.

The optical waveguide element 313 includes an opaque substrate 316, which may be comprised of a semiconductor, a metal or an insulating material, and a buffer layer 317 and an optical waveguide layer 318 are formed one on top of another on the substrate 316, for example, by evaporation, sputtering or CVD. The optical waveguide element 313 is disposed substantially normal to the optical axis of the present optical pick-up. In the present embodiment, this optical waveguide element 313 is so structured that the waveguide layer 318 functions as a single mode waveguide. That is, in this case, only the fundamental mode propagates along the waveguide layer 318 and thus no adverse affects are produced by changes in the wavelength in the order of several nanometers. It should be noted that the optical waveguide element 313 may also be so structured that the optical waveguide layer 318 serves as a multi-mode waveguide.

The buffer and optical waveguide layers 317 and 318 may be formed from a transparent material, such as a dielectric material like glass, $SiO_2$, $Si_3N_4$, $Nb_2O_5$ $Ta_2O_5$ and an organic material like polymer. The buffer layer 317 is provided to reduce the optical waveguide loss of the optical waveguide layer 318 so that the buffer layer 317 must be smaller in refractive index than the optical waveguide layer 318. However, if the optical waveguide loss is not a concern, the buffer layer 317 may be discarded. In addition, the buffer layer 317 may also be provided on the optical waveguide layer 318, which allows to further reduce the optical waveguide loss.

Moreover, the opaque substrate 316 is formed with an opening or through-hole 316a at a location where the light emitted from the semiconductor laser 311 is irradiated. Such an opening 316a may be formed, for example, by dry or wet etching, grinding, and ion milling. Alternatively, instead of forming an opening 316a, the opaque substrate 316 may be partly made transparent, for example, by thermal oxidation, laser annealing, or polishing. In addition, a combination of both of these techniques may be applied to the substrate 316 to permit light to pass through the substrate 316 at least partly.

On the optical waveguide layer 318 is provided a grating coupler 320 as a diffraction grating for causing the light from the exterior to be coupled to the optical waveguide layer 318 in alignment with and opposite to the objective lens 315. In the illustrated embodiment, the grating coupler 320 is a grating of the surface relief type having an equi-distant linear grating and is provided with a pair of grating regions 320a and 320b whose grating directions are orthogonal to each other. With respect to these grating regions 320a and 320b, the direction of oscillation of the light emitted from the semiconductor laser 311 is set in the direction indicated by D in FIG. 19. That is, it is so set that the angle θ formed between the plane of polarization of the incident light and the grating direction of each of the grating regions 320a and 320b is 45°. It is to be noted that the each of the grating regions 320a and 320b of the grating coupler 320 does not need to be an equi-distant grating and use may be made of any other grating. Besides, the grating coupler 320 does not need to be a linear grating, and it may be a curved grating to provide a focusing function. In addition, the grating coupler 320 may be so structured to partially differ in grating direction to provide a light splitting function. If such a focusing function and a light splitting function are provided, later-described focusing beam splitter 321a and an optical waveguide lens 321b may be discarded. In addition, the grating coupler 320 is not necessary to be of the surface relief type, the transverse cross sectional shape of the grating coupler 320 can be determined in any desired manner. Moreover, use may also be made of the refractive index distribution modulation type and the volume phase type. Such gratings may be made, for example, by diffusion or built-in methods. On the other hand, in the case where use is made of an opto-acoustic element, such as $LiNbO_3$, for the optical waveguide layer 318 and the buffer layer 317, use may be made of a grating due to elastic surface waves.

Moreover, on the optical waveguide layer 318 is provided a focusing beam splitter 321a comprised of a pair of optical waveguide lenses and an optical waveguide lens 321b adjacent to a corresponding one of the grating regions 320a and 320b of the grating coupler 320. The focusing beam splitter 321a has a flat light inlet surface which faces the grating region 320a and a curved light outlet surface at the opposite side, which may be either partially cylindrical or non-cylindrical. Thus, the focusing beam splitter 321a has a dual function of splitting the diffracted light from the grating coupler 320 into two separate light fluxes and also of causing each of the split light fluxes to be convergent. Each of the light fluxes split by the focusing beam splitter 321a is directed to a photodetector which will be described later. On the other hand, the optical waveguide lens 321b has a flat inlet surface which faces the grating region 320b and a curved light outlet surface at the opposite side, which may be either partially cylindrical or non-cylindrical, and the optical waveguide lens 321b has a function of causing the diffracted light from the grating coupler 320 to become convergent. The light flux which has been made convergent by the optical waveguide lens 321b is also directed to a photodetector which will be described later. In this case, the light inside of the waveguide has already been made convergent by the objective lens 315, so that the light immediately after diffraction comes to be emitted to be generated at a position which is optically equivalent to the light emitting point X indicated in FIG. 18 of the semiconductor laser 311.

These focusing beam splitter 321a and the optical waveguide lens 321b may be formed, for example, from $TiO_2$ or the like having the refractive index which is larger than that of the optical waveguide layer 318 by photolithography. Or, they may also be formed, for example, by causing only the lens portions to become high in refractive index to define a lens pattern with the use of impurity diffusion, ion exchange, proton exchange, or the like.

In addition, the opaque substrate 316 is formed with photodetectors 322 and 323 as buried therein and in contact with the terminal end of the optical waveguide layer 318. The photodetectors 322, in fact, includes two pairs, one of which includes photodetectors 322a and 322b and the other of which includes photodetectors 322c and 322d, and the two pairs are arranged side-by-side with a predetermined gap therebetween. Each of the photodetectors 322a through 322d may be comprised of a photodiode. If the opaque substrate 316 is comprised of a semiconductor material, such as Si and GaAs, the photodetectors 322 may be formed, for example, by introducing impurities into the substrate 316 by diffusion or ion implantation. If the photodetectors 322 are formed as buried in the substrate 316 as in the present embodiment, the photodetectors 322 may be formed in a monolithic structure, which is advantageous because it is high in structural integrity and it is not necessary to polish the end surface in providing the photodetectors 322 as so required in the prior art. On the other hand, if the opaque substrate 316 is comprised of an insulating material or a metal, photodiodes or the like provided on the optical waveguide layer 318 may be adopted as the photodetectors 322. A light signal detected by the photodetectors is processed to produce a recorded information read-out signal, an auto-focusing signal and a tracking signal, as will be described more in detail later. On the other hand, the photodetector 323 is comprised of a single photodetector and a light signal detected by this photodetector 323 is processed to produce a recorded information read-out signal, as will be described in detail later. These photodetectors 322 and 323 may also be formed by providing an overlying layer of photoconductive material, such as amorphous silicon, on the optical waveguide layer 318.

In the above-described embodiment, the divergent light emitted from the semiconductor laser 311 passes through the opening 316a of the optical waveguide element 313 and enters the grating coupler 320 where the light partly passes and is partly diffracted. And, the light passing through the grating coupler 320 passes through the objective lens 315 to be focused onto the information recording surface of the opto-magnetic disc 312 in the form of a spot. In this case, as described above, if it is so structured that the light emitted from the semiconductor laser 311 passes through the opening 316a of the opaque substrate 316, the substrate 316 is not limited to a transparent material, so that the optical waveguide element 313 can be made light in weight, low at cost and high in processibility and a substrate excellent in durability and degree of integration can be selected.

In carrying out recording or erasing, the light irradiated to the information recording surface of the opto-magnetic disc 312 causes the information recording surface heated locally whereby the heated portion of the information recording surface becomes magnetized in the direction of the magnetic field applied thereto as a bias magnetic field. On the other hand, in the case of carrying out read-out of recorded information, the plane of polarization of the light reflecting from the information recording surface is rotated over a minute angle due to the so-called Kerr effect or Faraday effect. That is, for the information "1" recorded on the opto-magnetic disc 312, the plane of polarization of the reflecting light is rotated over a predetermined angle. Denoting this angle of rotation by $+\theta_k$, the plane of polarization of the reflecting light for the information "0" is rotated over an angle of $-\theta_k$. The reflecting light with such rotation of the plane of polarization again passes through the objective lens 315 and enters the grating coupler 320 of the optical waveguide element 313 where the light is diffracted by the diffraction regions 320a and 320b of the grating coupler 320 to be guided and coupled into the optical waveguide layer 318 to be finally received by the photodetectors 322 and 323.

As described above, if the plane of polarization of the reflecting light is rotated over the angle of $+\theta_k$ by the information "1" recorded on the opto-magnetic disc 312, the angle $\theta$ defined between the plane of polarization of the light entering into the grating region 320a of the grating coupler 320 and the grating direction of the grating region 320a becomes somewhat larger than original 45°. For this reason, the diffraction efficiency in the diffraction region 320a is reduced so that the intensity of the light flux after diffraction by the diffraction region 320a is lowered. On the other hand, the angle $\theta$ defined between the plane of polarization of the light entering into the grating region 302b of the grating coupler 320 and the grating direction of the grating region 320b becomes somewhat smaller than original 45°, so that the diffraction efficiency in this case is increased. Accordingly, the intensity of the light flux after diffraction by the diffraction region 320b is increased.

In addition, the light flux after diffraction by the grating region 320a is diffracted and thus guided into the optical waveguide layer 318 to be received by the photodetectors 322a through 322d which thus provide outputs a through d. A sum of these outputs a through d, i.e., a+b+c+d, is reduced from the original level due to a reduction in light intensity as described above. On the other hand, the light flux after diffraction by the grating region 320b is diffracted and thus coupled into the optical waveguide layer 318 to be finally received by the associated photodetector 323 which then produces an output e. This output e is increased from the original level because of an increase in light intensity as described above. Thus, a differential output S among these outputs, i.e., $S=e-(a+b+c+d)$, is increased for the information "1" recorded on the opto-magnetic disc 321 because the plane of polarization of the reflecting light is rotated over the angle of $+\theta_k$.

On the other hand, when the plane of polarization of the reflecting angle is rotated over the angle of $-\theta_k$ by the information "0" recorded on the opto-magnetic disc 312, the angle $\theta$ defined between the plane of polarization of the light entering the grating region 320a of the grating coupler 320 and the grating direction of the grating region 320a becomes somewhat smaller than original 45°. For this reason, the diffraction efficiency in the grating region 320a is increased, and thus the intensity of the light flux after diffraction is increased. Accordingly, a sum of outputs a through d of the photodetectors 322a through 322d, i.e., (a+b+c+d), comes to be increased from the original level due to an increase in the light intensity as described above.

On the other hand, the angle $\theta$ defined between the plane of polarization of the light entering the grating region 320b of the grating coupler 320 and the grating direction of the grating region 320b becomes somewhat larger than original 45°, and, thus, the diffraction efficiency is increased for the light entering the grating region 320b. Thus, the light flux after diffraction by the grating region 320b has a reduced intensity. Thus, the output e from the photodetector 322 comes to be lowered from the original level due to a reduction in light intensity as described above. As a result, the differential output S of these outputs, i.e., $S=e-(a+b+c+d)$, comes to be reduced because the plane of polarization of the reflecting light is rotated over the angle of $-\theta_k$ by the information "0" recorded on the opto-magnetic disc 312.

From the above, if a circuit is so set to obtain the condition of $S=0$ for a set reference direction, S is larger than 0 for the information "1" and S is smaller than 0 for the information "0". Utilizing this, the information recorded on the disc 312 can be read.

Furthermore, depending on whether the opto-magnetic disc 312 is located closer to or further away from the optical pick-up and whether or not a beam spot on the information recording surface of the disc 312 is shifted in position from an information track, such as a series of pits, an auto-focusing control operation and an auto-tracking control operation can be carried out. Such control operations involve an actuator (not shown) which moves the objective lens 315 or a unit including the optical waveguide element 313 and the light source 311 relative to the disc 312.

Figure 20:
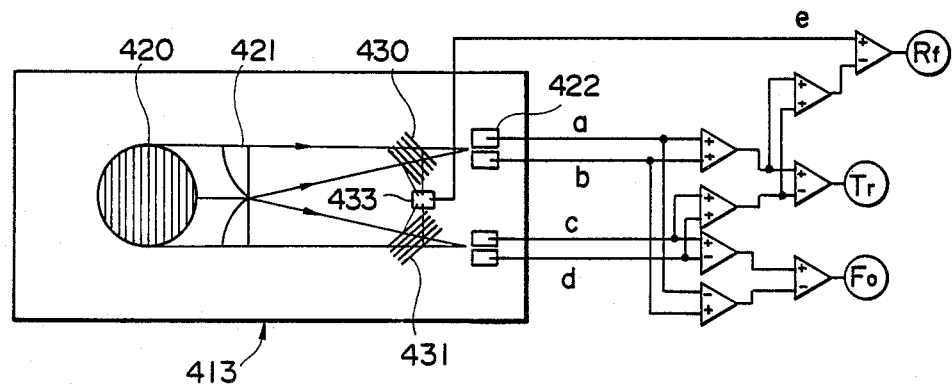
FIG. 20 is a schematic illustration showing in plan view a modified optical waveguide element 413 which may be advantageously used in the optical pick-up of FIG. 18.
Figure 21:
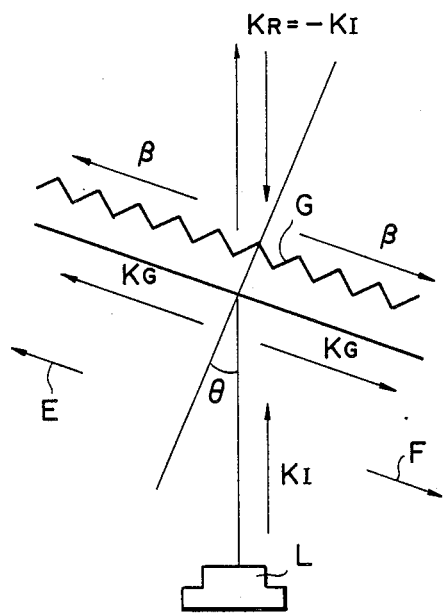
FIG. 21 is a schematic illustration which is useful for explaining the effects of arranging an optical waveguide element inclined with respect to an incident light beam.

FIG. 20 illustrates another embodiment in which the present invention is applied to an optical pick-up using an opto-magnetic disc as a recording medium. In the present embodiment, there is provided a grating coupler 420 which is entirely comprised of an equi-distant linear grating. The grating direction of this grating coupler 420 forms an angle of 45°, with the direction of oscillation of the light emitted from the light source. In the vicinity of the grating coupler 420 is provided an optical waveguide lens beam splitter 421 which has a dual function of splitting and focusing the diffracted light. Also provided is a pair of TE-TM mode splitters 430 and 431 which cause the light flux emitted from the optical waveguide lens beam splitter 421 to be divided into TE mode light and TM mode light. TE mode light is an electric field component which is in parallel with the optical waveguide, i.e., a component in parallel with the plane of the drawing, and TM mode light is an electric field component which is substantially perpendicular to the optical waveguide, i.e., a component perpendicular to the plane of the drawing.

TE-TM mode splitters 430 and 431 may be comprised of a grating of the surface relief type or the volume phase type, and these TE-TM mode splitters 430 and 431 are arranged to receive the respective split diffracted light fluxes. The TE-TM mode splitter 430 is so set to satisfy the Bragg reflecting condition so as to cause TM mode light to be reflected. In addition, between the above-described two TE-TM mode splitters 430 and 431 is disposed a photodetector 433 for receiving the light reflecting from the TE-TM mode splitter 430. It is so structured that the TE mode light passes through the TE-TM mode splitter 430 to reach the photodetector 422.

In the present embodiment, when the light reflecting from the opto-magnetic disc and thus having its plane of polarization rotated in accordance with the recorded information is diffracted by the grating coupler 420, the diffracted light is then divided into two separate light fluxes by the optical waveguide lens beam splitter 421, so that the divided light fluxes are focused onto the respective photodetectors 422. These convergent light fluxes are divided into TE mode light and TM mode light by means of the TE-TM mode splitters 430 and 431 and then enter the photodetectors 422 and 433. In this case, a difference $R_f$ between the output e from the photodetector 433 and a sum of outputs from the photodetectors 422, i.e., $a+b+c+d$, is either increased or decreased depending on the recorded information so that it becomes either positive or negative. As a result, the contents of the recorded information can be recognized.

TE and TM modes propagating through the optical waveguide layer 418 have a number of modes from the fundamental mode (0 order mode) to high order mode (1st order or higher). However, for the enhancement of the coupling efficiency and the ease of designing of the grating coupler 420 and the TE-TM mode splitters 430 and 431, it is preferable to so structure that only the light of fundamental mode of TE and TM modes is guided. For this purpose, the thickness of the optical waveguide layer 418 must be appropriately selected.

It is to be noted that in each of the above-described embodiments, use may be made of light emitted from a light source, which is linearly polarized, elliptically polarized or circularly polarized. In addition, in order to obtain a spot of smaller diameter, it is preferable to use light which is coherent as much as possible; however, use may also be made of incoherent light.

In general, the efficiency of the grating coupler is dependent upon the angle of polarization, and, thus, the amount of light to be guided and coupled varies depending on the angle defined between the direction of polarization of incident light and the grating direction. This angle may be set arbitrarily. However, it will be considered as to the most favorable condition below.

Denoting the diffraction efficiency of incident light into the optical waveguide layer of the grating coupler by $\eta$, the efficiency of a condensing or focusing lens system by t, the light reflectivity of the information recording medium by R, the light emitting power of the light source by P, and the proportional constant by C, then the power $P_c$ of the light to be coupled to the optical waveguide layer may be expressed by the following equation.

$$P_c = Ct^2R(1-\eta)P\eta$$

The value of $\eta$ to make $P_c$ maximized is given by $$dP_c/d\eta = 0$$

assuming C, t, R and P to be at constant. Thus, we have $$dP_c/d\eta = Ct^2R(1-2\eta)P.$$

From this, we obtain $\eta = 0.5$. That is, if it is so set that the diffraction efficiency of the grating coupler is 50%, the power of the light coupled to the optical waveguide can be made at maximum, which would allow to carry out an excellent signal detecting operation.

The diffraction efficiency of the grating coupler varies significantly depending on the shape of the grating and the refractive index. And, if the diffraction efficiency of the grating coupler is relatively large, the above-described condition of 50% diffraction efficiency can be obtained by setting the angle between the direction of polarization of the incident light and the grating direction approximately at 45°. This should hold true for each of the above-described embodiments. However, in the case of recording information on an optical information recording medium, it is preferable to make the diffraction efficiency to be as small as possible to thereby make the light intensity on the information recording surface to be as large as possible. Thus, it is conceivable to provide an embodiment in which the angle between the grating coupler and the incident light may be adjusted to vary the diffraction efficiency appropriately.

Next, let us consider the case in which a grating coupler G is inclined with respect to the optical axis of a light source L. In this case, denoting the center wave number of the light emitted from the light source L by $K_I$, the grating vector by $K_G$, the propagating constant of the waveguide mode of the optical waveguide layer by $\beta$, the angle defined between the incident light and the direction normal to the grating by $\theta$, the order of the grating by N ($N = \pm 0, \pm 1, \pm 2, \pm 3, \ldots$) and the refractive index of the air by n, then the condition for the diffraction efficiency $\eta$ to be high is given by the following expression.

$$\beta + NK_g = \pm nK_I \sin\theta$$

If $NK_G$ is so set that only one of the positive and negative values holds true in the above equation, the incident light has an increased coupling intensity in either one of the E and F directions of the optical waveguide layer depending on the condition thus set. And, the light reflecting from a light information recording medium has an increased coupling intensity in the direction opposite to that of the incident light. Thus, by arranging the optical waveguide layer inclined with respect to the optical axis of the light emitted from the light source L, the incident light and the reflecting light can be coupled to the optical waveguide layer in opposite directions. And, if a photodetector is provided in the direction of larger reflection, then the coupling intensity from the reflecting light can be increased while reducing the light intensity of the coupled incident light, so that the SN ratio in an information signal can be increased. This should hold true for each of the above-described embodiments.

Figure 22:
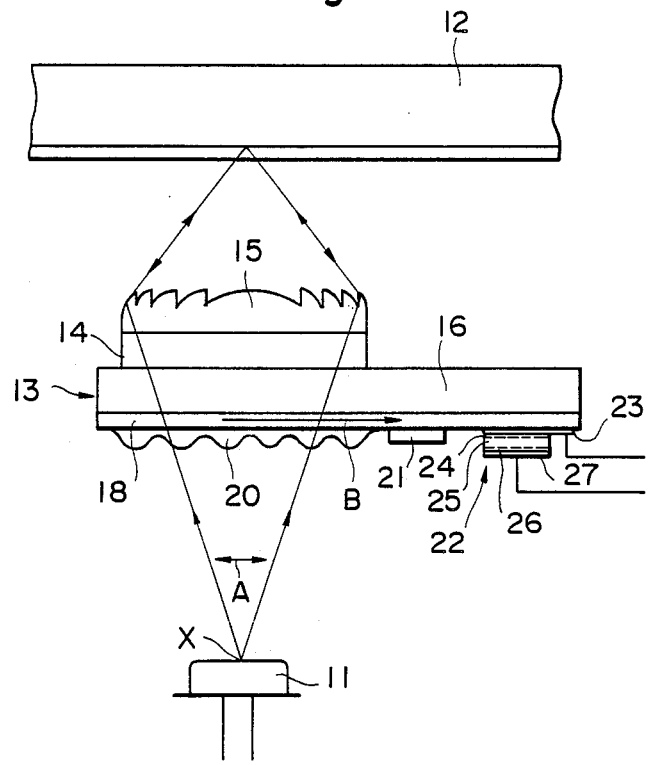
FIG. 22 is a schematic illustration showing the overall structure of an optical pick-up constructed in accordance with a still further embodiment of the present invention.

Referring now to FIG. 22, there is shown an optical pick-up constructed in accordance with a still further embodiment of the present invention. As shown, between a semiconductor laser 11 as a light source and an optical disc 12 as a recording medium is disposed an optical waveguide element 13. And, a quarter wavelength plate 14 is provided on the optical waveguide element 13 as fixedly attached thereto and a Fresnel type objective lens 15 is provided on the quarter wavelength plate 14 as fixedly attached thereto. The optical waveguide element 13 includes a transparent substrate 16 comprised, for example, of glass, and an optical waveguide layer 18 is formed on the bottom surface of the substrate 16 from a material having a high refractive index, for example, by evaporation, sputtering or CVD. The transparent substrate 16 is arranged such that its longitudinal direction is substantially perpendicular to the optical axis of the optical pick-up. As a material for forming the optical waveguide layer 18, use may be made of high refractive index glass, a dielectric material like $Si_3N_4$, $Nb_2O_5$, an $Ta_2O_5$, an organic material like a polymer, and a material formed from ion exchange. In the present embodiment, the optical waveguide element 13 is so structured as a single mode optical waveguide; however, it may also be so structured as a multi-mode waveguide, if desired. In the former case, only the fundamental mode is allowed to propagate through a waveguide, and no adverse affects are produced even if the wavelength varies in the order of several nanometers.

On the optical waveguide element 18 is provided a grating coupler 20 as a polarizing diffraction grating opposite to the semiconductor laser 11. The grating coupler 20 is a grating of the surface relief type having an equi-distant linear grating, and it has an extremely low diffraction efficiency for the light emitted from the semiconductor laser 11, which is the P polarization light oscillating in the direction A shown in FIG. 22, and an extremely high diffraction efficiency for the reflecting light from the information recording surface, which is the S polarization light. Thus, the light emitted from the semiconductor laser 11 passes through the grating coupler 20 substantially without diffraction and the reflecting light from the information recording surface is diffracted and coupled to the optical waveguide layer 18 by means of the grating coupler 20.

Moreover, on the optical waveguide layer 18 is provided a pair of grating beam splitters 21 and 21 including an equi-distant linear grating as a splitting diffraction grating adjacent to the grating coupler 20. These grating beam splitters 21 and 21 are so arranged with their grating directions extending different directions, so that the diffracted light from the grating coupler 20 is split into two separate light fluxes by this pair of grating beam splitters 21 and 21. The thus split light fluxes are directed to respective photodetectors. In this case, since the light within the optical waveguide has already been made to be convergent by the function of the objective lens 15, so that the focusing point on the corresponding photodetector is located at an optically equivalent position of the light emitting point (indicated by X in FIG. 22) of the semiconductor laser 11. In addition, by providing a focusing action to the grating beam splitters 21 and 21, the distance to the focusing point may be made shorter.

In the illustrated embodiment, four photodetectors 22 are provided at the terminal end of the optical waveguide layer 18. Each of these photodetectors 22 is comprised of a photodiode, and, as shown in FIG. 2, these four photodetectors are grouped into two pairs which are separated away from each other over a predetermined distance. That is, the photodetectors 22a and 22b form one pair and the photodetectors 22c and 22d form the other pair. In the illustrated embodiment, each of these photodetectors 22a through 22d is formed by a PIN photodiode including a P type a-Si film 24 formed on a transparent electrically conductive film 23 formed on the optical waveguide layer 18, a high resistance a-Si film 24 formed on the conductive film 23, a N type a-Si film 26 formed on the high resistance film 25 and an Al electrode 27 formed on the film 26. A light signal detected by these photodetectors 22 is processed to produce a recorded information read-out signal, an auto-focusing signal and an auto-tracking signal.

In the above-described embodiment, the divergent light emitted from the semiconductor laser 11 enters the grating coupler 20 provided on the optical waveguide element 13, and, since this light is the P polarization light, it is not diffracted by the grating coupler 20 and thus passes through the grating coupler 20 and the optical waveguide element 13. Thereafter, the light also passes through the quarter wavelength plate 14 to become circularly polarized light, which is then focused onto the information recording surface of the optical disc 12 as a recording medium by means of the objective lens 15. The light reflecting from the information recording surface of the optical disc 12 then passes through the objective lens 15 in the opposite direction to thereby become a parallel light flux which, in turn, passes through the quarter wavelength plate 14 in the opposite direction to thereby become S polarization light before entering the grating coupler 20 from above.

Since the grating coupler 20 has an extremely high diffraction efficiency for the S polarization light, the reflecting light from the optical disc 12 is effectively diffracted, so that light is excited in the optical waveguide layer 18, thereby separating the reflecting light from the information recording surface from the incident light. In this case, since there is defined a single mode optical waveguide, only the fundamental mode propagates along the optical waveguide, so that the light diffracted by the grating coupler 20 propagates in a direction which is substantially parallel to the grating surface. This light inside of the optical waveguide is then split into two light fluxes by the grating beam splitter 21 and each of the thus split light fluxes is directed to the corresponding pair of the photodetectors 22. And, when the optical disc 12 is located at a predetermined reference position, one of the two separate light fluxes is directed to the center between the pair of the photodetectors 22a and 22b and the other light flux is directed to the center between the pair of the photodetectors 22c and 22d.

Designating outputs from the respective photodectctors 22a, 22b, 22c and 22d by a, b, c and d, respectively, a focusing error signal df may be expressed by the following equation.

$$df=(a+d)-(b+c)$$

That is, when the optical disc 12 is located at a predetermined reference position, the conditions of a=b and c=d hold, so that df=0. On the other hand, if the optical disc 12 is located closer to the optical pick-up device, the light fluxes are shifted in position as shown in FIG. 3a, so that a is larger than b and c is smaller than d, which results in df being larger than 0. On the contrary, if the optical disc 12 is located further away from the optical pick-up device, the light fluxes are shifted in position as shown in FIG. 3b, so that a is smaller than b and c is larger than d, which results in df being smaller than 0. As a result, depending on the sign of parameter df, the direction of focusing error can be determined. Under the condition, the objective lens 15 or the optical pick-up device as a whole is moved along the optical axis relative to the optical disc 12 by means of an actuator (not shown) so as to obtain the condition of df=0 at all times, thereby carrying out an auto-focusing control operation.

On the other hand, a tracking error signal dt can be expressed by the following equation.

$$dt=(a+b)-(c+d)$$

That is, if a light spot formed on the information recording surface of the optical disc 12 is located right on an information track, such as a series of pits, then the condition of dt=0 is obtained; whereas, if the light spot is shifted in position from the information track, then dt becomes either larger than or smaller than 0. Thus, depending on the sign of parameter dt, the direction of tracking error can be determined, so that the auto-tracking control operation is carried out by moving the objective lens 15 or the optical pick-up device as a whole in the direction perpendicular to the information track by means of an actuator (not shown) so as to maintain the condition of dt=0.

Furthermore, the recorded information read-out signal S for reading information recorded on the optical disc 12 can be defined as a sum of the output from all of the photodetectors 22.

$$S=a+b+c+d$$

Figure 23:
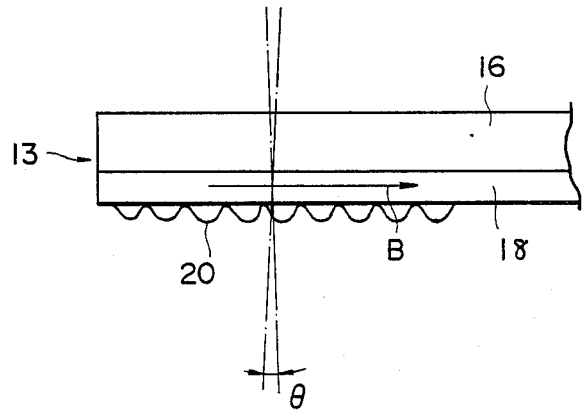
FIGS. 23 through 27 are schematic illustrations showing various modifications of the structure shown in FIG. 22.

In addition, as shown in FIG. 23, if the optical waveguide element 13 is arranged as inclined such that light in incident at an angle θ with respect to the optical axis of the optical pick-up, all of the light coupled into the optical waveguide layer 18 can be caused to advance in the direction indicated by the arrow B, thereby preventing the light from advancing in the direction opposite to B. As described previously, this condition can be set by satisfying the equation set forth in connection with FIG. 5.

Figure 24:
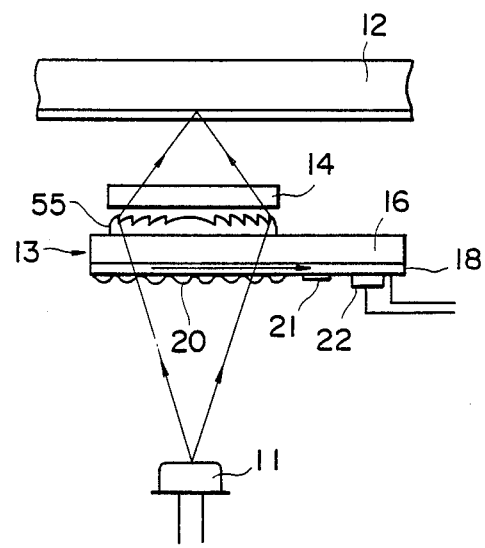
Figure 25:
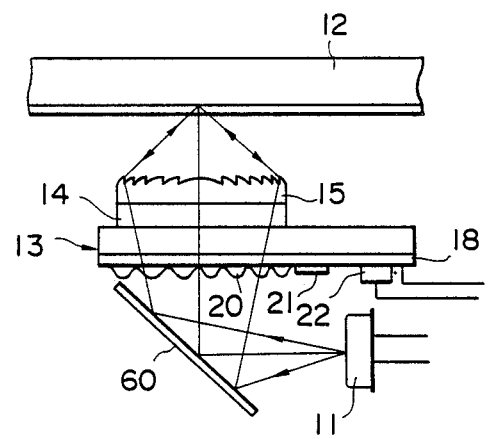
Figure 26:
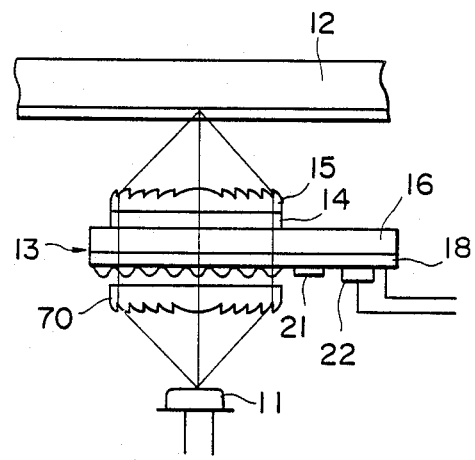
Figure 27:
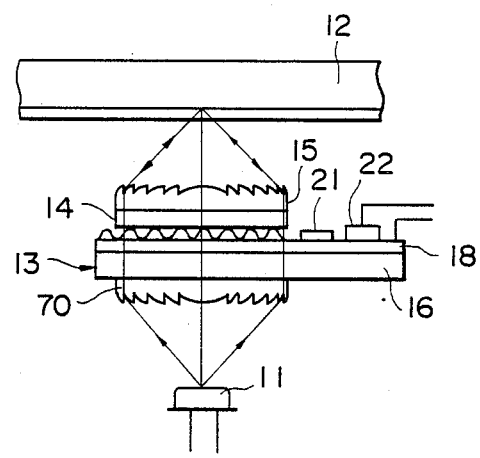
Figure 28:
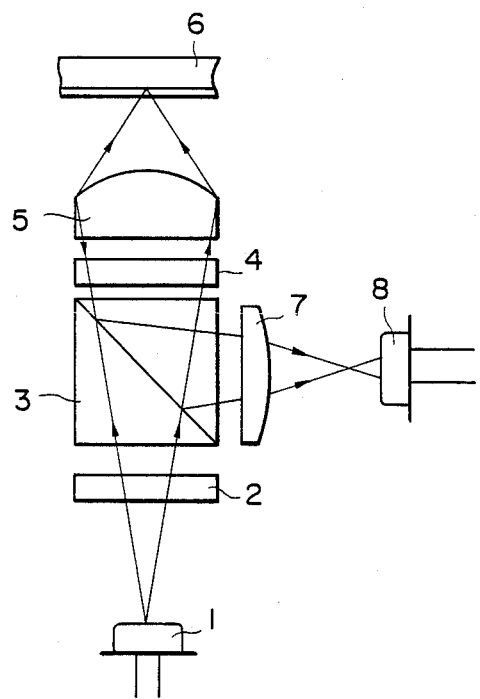
FIG. 28 is a schematic illustration showing a typical prior art optical pick-up using a cubic beam splitter.

The structure shown in FIG. 22 may be modified in a manner similar to the structure shown in FIG. 6 by providing thin film prisms 41 in place of the grating beam splitters 21. FIG. 24 shows a further modification of the structure of FIG. 22, in which use is made of a micro Fresnel lens 22 as an objective lens. In the illustrated modification, the micro Fresnel lens 55 is fixedly attached to the rear side of the optical waveguide element 13 and the quarter wavelength plate 14 is disposed immediately above the micro Fresnel lens 55. FIG. 25 shows a still further modification of the structure shown in FIG. 22, in which a mirror 60 is disposed between the optical waveguide element 13 and the semiconductor laser 11, thereby permitting to locate the semiconductor laser 11 at any convenient location. FIG. 26 shows a still further modification of the structure shown in FIG. 22, in which a collimator lens 70 in the form of a Fresnel lens is disposed between the optical waveguide element 13 and the semiconductor laser 11, so that it is possible to form a light spot of smaller diameter on the information recording surface of the optical disc 12. FIG. 27 shows a modification of the structure shown in FIG. 26, in which the optical waveguide element 13 is turned upside down and the collimator lens 70 is fixedly attached to the rear surface of the optical waveguide element 13. It is to be noted that use has been made of a grating coupler of the surface relief type in each of the above-described embodiments; however, use may also be made of various kinds of gratings as the polarizing diffraction grating of the present invention, including the volume phase type and the amplification type.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. An optical pick-up device for optically reading and/or recording information from and/or to a recording medium, comprising:
    an opaque substrate formed with an opening through which light may pass;
    an optical waveguide formed on said substrate, said optical waveguide also extending across said opening;
    a first diffraction grating formed on said optical waveguide located in registry with said opening;
    detecting means provided integrally with said substrate for detecting diffracted light from said first diffraction grating; and
    focusing means for focusing light passing through said opening of said substrate onto said recording medium.

2. The device of claim 1, further comprising beam splitting means formed on said substrate for splitting diffracted light from said first diffraction grating into two separate light beams which are directed toward said detecting means.

3. The device of claim 2, wherein said detecting means includes two pairs of photodetectors which are spaced apart over a predetermined distance and which are buried in said substrate.

4. The device of claim 2, wherein said beam splitting means includes a pair of second diffraction gratings whose grating directions are different from each other with respect to the direction of advancement of the diffracted light from said first diffraction grating.

5. The device of claim 2, wherein said beam splitting means includes a pair of thin film lenses each of which has an inlet surface and an outlet surface.

6. The device of claim 5, wherein both of said inlet and outlet surfaces are flat.

7. The device of claim 5, wherein at least one of said inlet and outlet surfaces is curved.

8. The device of claim 2, wherein said beam splitting means includes a pair of thin film Fresnel lenses.

9. The device of claim 1, wherein said first grating is an equi-distant grating.

10. The device of claim 1, wherein said first grating is a linear grating.

11. The device of claim 1, wherein said first grating is a curved grating.

12. The device of claim 1, wherein said focusing means includes an objective lens.

13. The device of claim 12, wherein said objective lens is a micro Fresnel lens.

14. The device of claim 13, wherein said micro Fresnel lens is fixedly attached to said substrate.

15. The device of claim 12 further comprising a quarter wavelength plate disposed between said focusing means and said first diffraction grating.

16. The device of claim 15 wherein said quarter wavelength plate is fixedly attached to said first diffraction grating and said micro Fresnel lens is fixedly attached to said quarter wavelength plate.

17. The device of claim 1 further comprising a buffer layer interposed between said substrate and said first diffraction grating.

18. The device of claim 1, wherein said substrate is inclined at a predetermined angle with respect to an optical axis of said optical pick-up.

19. An optical pick-up device for optically reading and/or recording information from and/or to a recording medium, comprising:

a transparent substrate having a first surface and a second surface which is opposite to said first surface;

an optical waveguide formed on said first surface of said substrate;

a first linear diffraction grating formed on said optical waveguide;

beam splitting means formed on said optical waveguide for splitting diffracted light from said first linear diffraction grating into at least two separate light beams; and detecting means provided integrally with said transparent substrate for detecting said light beams from said splitting means.

20. The device of claim 19, wherein said substrate is formed with an opening in registry in location with said first diffraction grating.

21. The device of claim 19, wherein said beam splitting means includes a pair of second diffraction gratings.

22. The device of claim 19, wherein said focusing means includes a micro Fresnel lens.

23. The device of claim 22, wherein said micro Fresnel lens is fixedly attached to said substrate.

24. The device of claim 22, further comprising a quarter wavelength plate interposed between said micro Fresnel lens and said substrate.

25. The device of claim 24, wherein said quarter wavelength plate is fixedly attached to said micro Fresnel lens and also to said substrate.

26. The device of claim 25, further comprising focusing means provided for focusing light passing through said transparent substrate onto said recording medium.

* * * * *